(12) United States Patent
Tanjou

(10) Patent No.: US 7,115,332 B2
(45) Date of Patent: Oct. 3, 2006

(54) POWER SUPPLY UNIT

(75) Inventor: Yuuji Tanjou, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 610 days.

(21) Appl. No.: 10/395,119

(22) Filed: Mar. 25, 2003

(65) Prior Publication Data

US 2003/0186116 A1   Oct. 2, 2003

(30) Foreign Application Priority Data

Mar. 26, 2002  (JP)  ............................. 2002-085763

(51) Int. Cl.
*H01M 16/00*  (2006.01)
*H01M 10/42*  (2006.01)

(52) U.S. Cl. ............................. 429/9; 429/61
(58) Field of Classification Search ............ None
See application file for complete search history.

(56) References Cited

U.S. PATENT DOCUMENTS 6,373,222 B1 *  4/2002  Odaohhara ................. 320/116

FOREIGN PATENT DOCUMENTS

| EP | 1 096 636 A2 | 5/2001 |
| JP | 11-332023 | * 11/1999 |
| JP | 11-332023 A | 11/1999 |
| JP | 2000-277175 A | 10/2000 |
| JP | 2001-037098 A | 2/2001 |
| JP | 2001-243987 A | 9/2001 |
| JP | 2001-268814 A | 9/2001 |

* cited by examiner

*Primary Examiner*—Jonathan Crepeau
(74) *Attorney, Agent, or Firm*—Foley & Lardner LLP

(57) ABSTRACT

A power supply unit comprises a solid electrolyte battery constituted by using a solid electrolyte alone and a liquid electrolyte battery constituted by using an electrolytic solution connected in parallel to each other. Since the solid electrolyte battery is primarily utilized at high temperature and the liquid electrolyte battery is primarily utilized at low temperature, a power supply unit can achieve durability characteristics at high temperature equivalent to those of a power supply unit constituted of solid batteries alone and output characteristics at low temperatures equivalent to those of liquid electrolyte batteries alone, is provided.

22 Claims, 11 Drawing Sheets

POWER SUPPLY UNIT

BACKGROUND OF THE INVENTION

1. Field of the Invention

The present invention relates to a power supply unit constituted by connecting at least two types of batteries.

2. Related Art

Japanese Laid-Open Patent Publication No. H 11-332023 discloses a power supply unit constituted by connecting in parallel a high power density type battery and a high energy type battery, which makes it possible to sustain high output characteristics over an extended period of time.

SUMMARY OF THE INVENTION

A battery normally has a predetermined desirable operating temperature range, and while the temperature range varies depending upon the battery type, no specific combination of batteries is examined by taking into consideration their operating temperatures in the related art mentioned above.

A power supply unit according to the present invention comprises a solid electrolyte battery constituted by using a solid electrolyte instead of an electrolyte solution and a liquid electrolyte battery constituted by using an electrolytic solution, which are connected in parallel to each other.

While the solid electrolyte battery that does not contain any electrolytic solution demonstrates outstanding durability at high temperatures, its output characteristics (the maximum discharge power and the maximum charge power), particularly at low temperatures, are poor due to a significant resistance of the solid electrolyte. The liquid electrolyte battery, on the other hand, achieves excellent output characteristics due to small internal resistance and is capable of sustaining good output characteristics at low temperatures, but its durability at high temperatures is poor since it is constituted by using an electrolytic solution. According to the power supply unit of the present invention achieved by connecting in parallel these batteries, the liquid electrolyte battery is primarily used to achieve good output characteristics under low temperature conditions in which the output characteristics of the solid electrolyte battery are poor and the onus on the liquid electrolyte battery when controlling power is reduced to delay the process of degradation under high temperature conditions in which the solid electrolyte battery is allowed to achieve good output characteristics.

A power control device such as a relay or a variable resistor may be used so as to be connected in series to the liquid electrolyte battery. For instance, the power control device may control the power at the liquid electrolyte battery in conformance to the temperature of the liquid electrolyte battery.

Alternatively, the power control device may control the power at the liquid electrolyte battery in conformance to the temperature of the solid electrolyte battery.

DETAILED DESCRIPTION OF THE PREFERRED EMBODIMENTS

The following is an explanation of embodiments of the power supply unit according to the present invention, given in reference to the drawings.

First Embodiment

Figure 1:
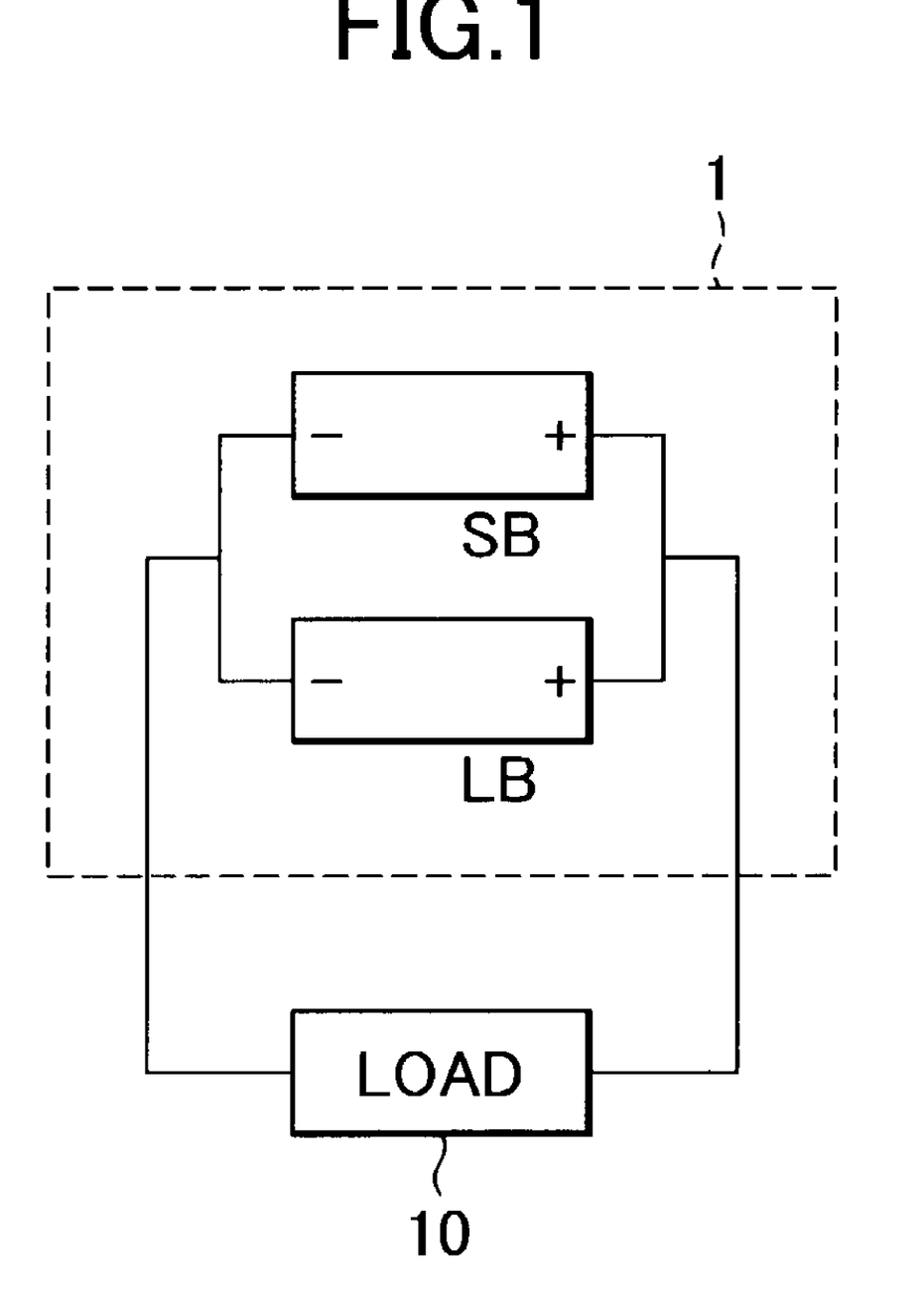
FIG. 1 shows a schematic diagram of a power supply unit adopted in the first embodiment of the present invention.

FIG. 1 shows a first embodiment of the present invention. A power supply unit 1 is constituted by connecting in parallel a solid electrolyte lithium battery SB and a liquid electrolyte lithium battery LB. In the solid electrolyte lithium battery SB, only a high polymer solid electrolyte constituted by, for instance, dissolving lithium salt into PEO (polyethylene oxide) is used. In other words, the solid electrolyte lithium battery SB comprises a solid electrolyte instead of an electrolyte solution. In the liquid electrolyte lithium battery LB, a liquid electrolyte achieved by, for instance, dissolving lithium chloride into PC (propylene carbonate) is used.

Figure 2:
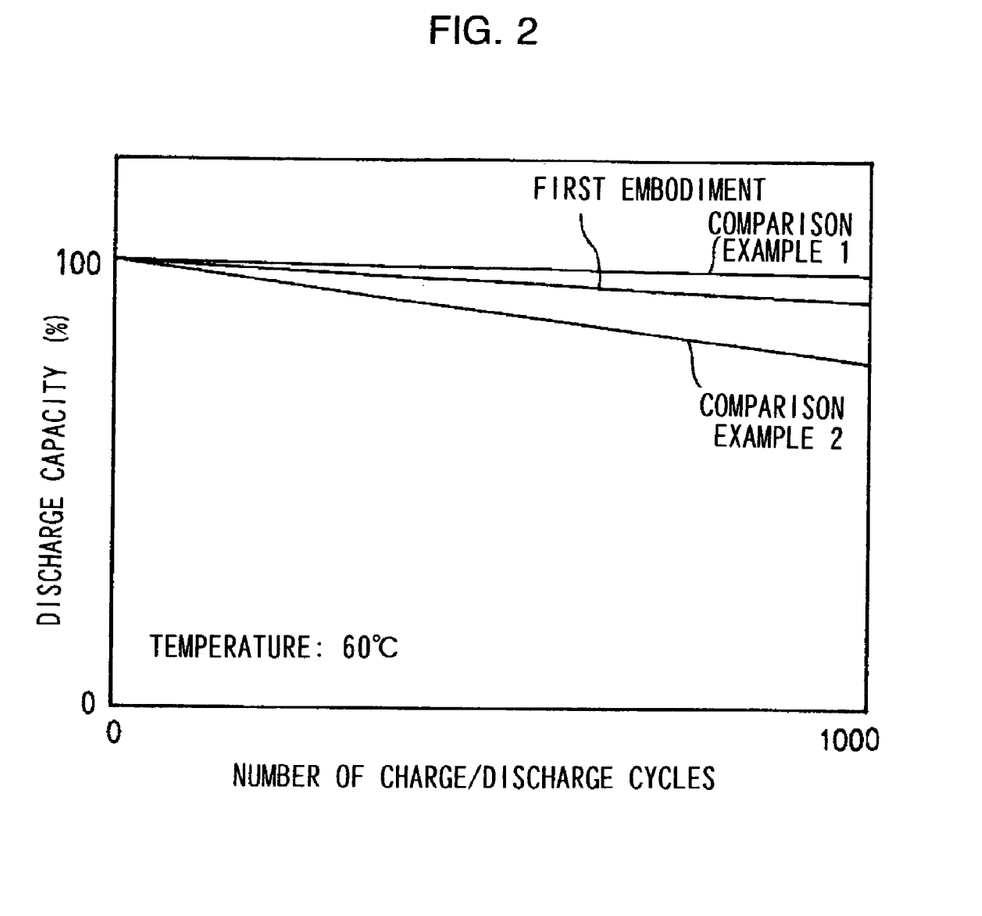
FIG. 2 shows a characteristics diagram of durability characteristics at high temperature.
Figure 3:
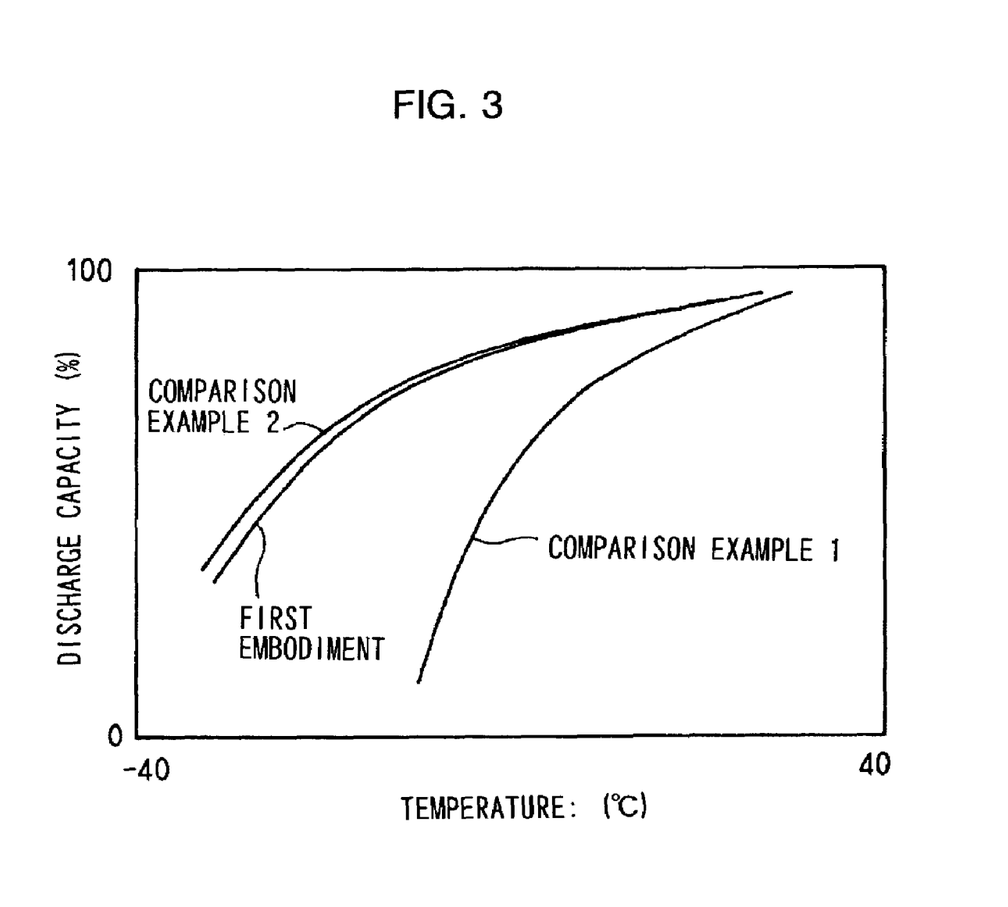
FIG. 3 shows a characteristics diagram of output characteristics.

FIGS. 2 and 3 provide the results of comparisons of a power supply unit having only solid lithium batteries SB connected in parallel to each other which is prepared as comparison example 1 and a power supply unit having only liquid electrolyte lithium batteries LB connected in parallel to each other prepared as comparison example 2 with the power supply unit achieved in the first embodiment.

FIG. 2 shows durability characteristics observed at a relatively high temperature (60° C.). While the discharge capacity of all the power supply units becomes lower as they are repeatedly engaged in charge/discharge, the power supply unit in the first embodiment achieves durability characteristics closer to those of comparison example 1 in which only solid lithium batteries SB are used rather than those of comparison example 2 in which only liquid electrolyte lithium batteries LB are used and a significant reduction in the capacity is observed. This is attributed to reduced onus on the liquid electrolyte lithium battery LB under high temperature conditions in which the solid electrolyte lithium battery SB is allowed to achieve full output and to the resulting delay in the process of degradation of the liquid electrolyte lithium battery LB.

FIG. 3 shows output characteristics observed over a wide temperature range (−40° C.~40° C.). While the discharge capacity of all the power supply units becomes reduced as the temperature is lowered, the power supply unit in the first embodiment achieves output characteristics substantially equivalent to those of comparison example 2 in which only liquid electrolyte lithium batteries LB are used. In the comparison example 1 in which only solid lithium batteries SB are used, a significant reduction in capacity is observed. This is attributed to the fact that since a majority of the load is handled by the liquid electrolyte lithium battery LB under low temperature conditions in which the solid electrolyte lithium battery SB cannot function effectively, the temperature inside the liquid electrolyte lithium battery LB rises to a great extent due to internal heat generation to achieve higher single-battery output characteristics compared to those of the individual liquid electrolyte lithium batteries LB in comparison example 2.

By connecting the solid electrolyte lithium battery SB and the liquid electrolyte lithium battery LB in parallel to each other as described above, performance, i.e. the durability characteristics substantially equivalent to that achieved by solid lithium batteries in the high temperature range and the output characteristics substantially equivalent to that achieved by liquid electrolyte lithium batteries in the low temperature range can be realized over the entire temperature range.

Second Embodiment

Figure 4:
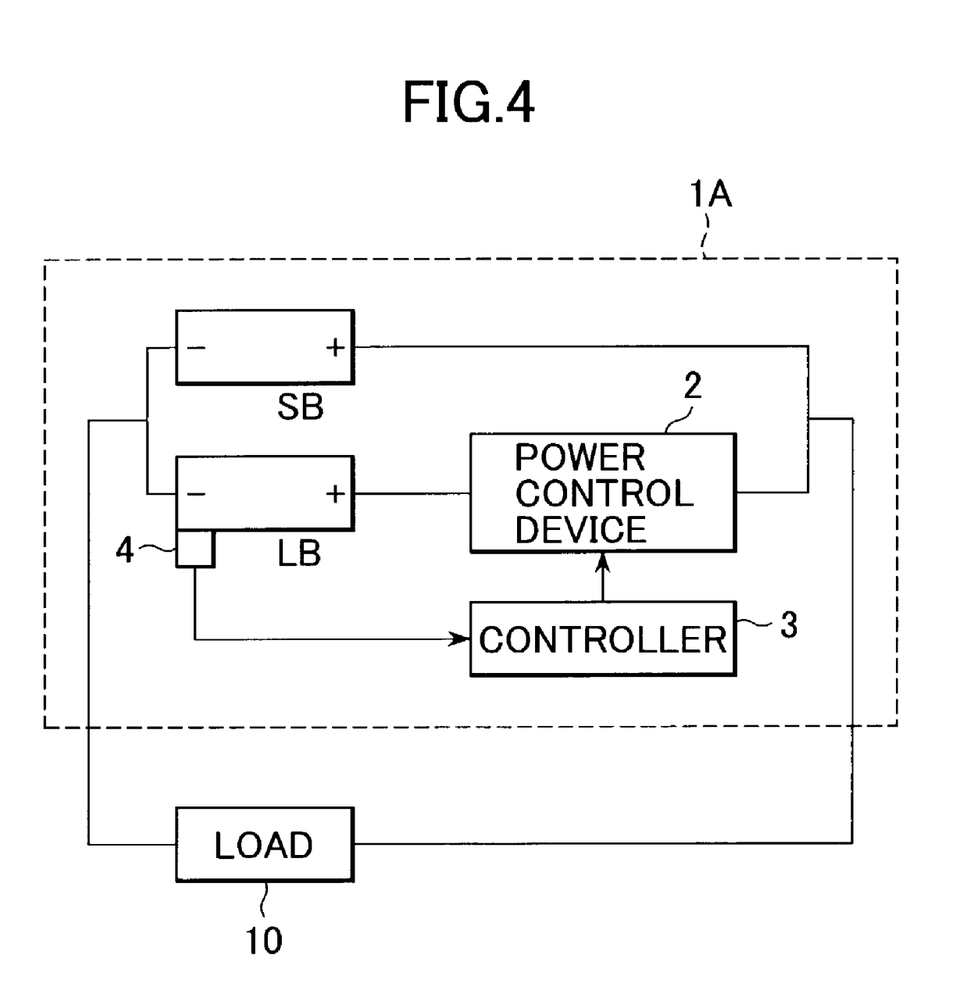
FIG. 4 shows a schematic diagram of a power supply unit adopted in the second embodiment of the present invention.

FIG. 4 shows a second embodiment of the present invention. A power supply unit 1A according to the second embodiment comprises a solid electrolyte lithium battery SB, a liquid electrolyte lithium battery LB connected in parallel to the solid electrolyte lithium battery SB, and a power control device 2 connected in series to the liquid electrolyte lithium battery LB. In other words, the power control device 2 is connected in parallel to the solid electrolyte lithium battery SB. The power control device 2, which may be a relay or a variable resistor, controls the input/output power of the liquid electrolyte lithium battery LB in response to a control signal provided by a controller 3. The controller 3 generates the control signal for the power control device 2 based upon an output signal from a temperature sensor 4 set in close proximity to the liquid electrolyte lithium battery LB. It is to be noted that since the temperature sensor 4 is only required to output a signal correlating to the temperature of the liquid electrolyte lithium battery LB, it is not necessary to set the temperature sensor 4 in complete contact with the liquid electrolyte lithium battery LB.

Figure 5:
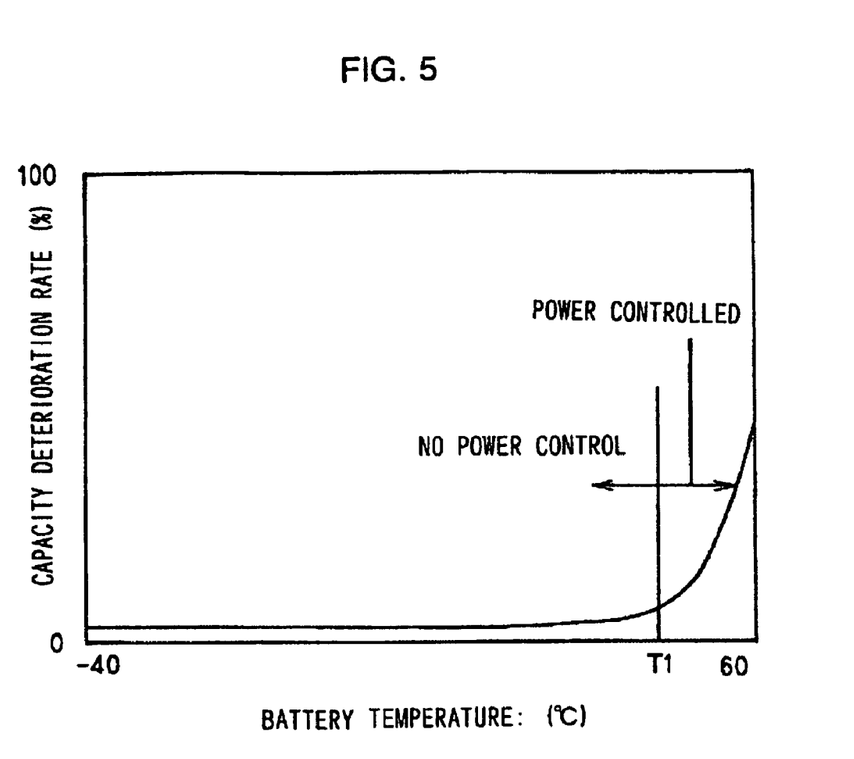
FIG. 5 shows a characteristics diagram of temperature-dependent degradation characteristics observed in liquid electrolyte batteries.
Figure 6:
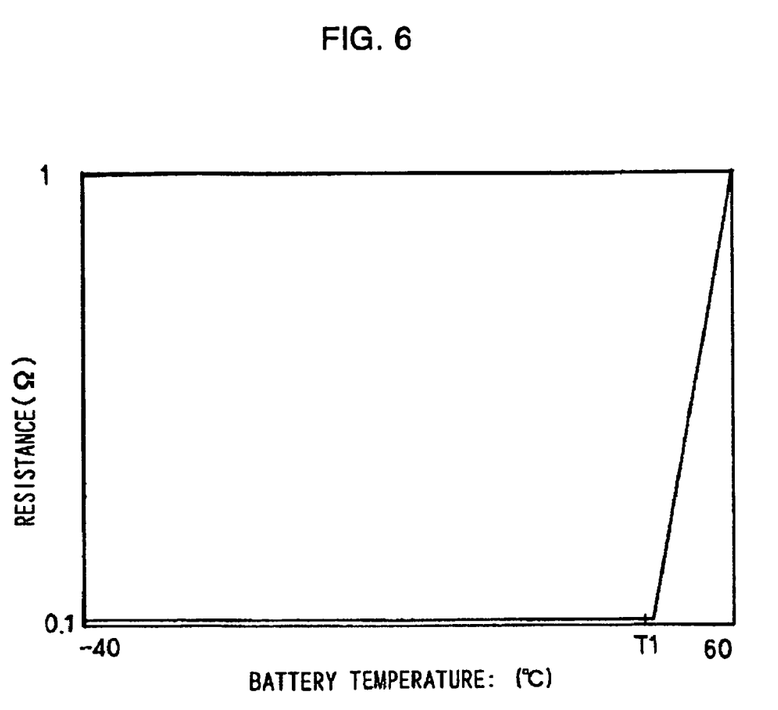
FIG. 6 shows a characteristics diagram of temperature-dependent resistance value characteristics observed in a variable resistor.

FIG. 5 shows the relationship between the battery temperature of the liquid electrolyte lithium battery LB and the capacity deterioration rate. The liquid electrolyte lithium battery LB has characteristics whereby the capacity deterioration progresses rapidly after the temperature exceeds a specific temperature T1. Therefore, the controller 3 controls the input/output power of the liquid electrolyte lithium battery LB when the output signal from the temperature sensor 4 indicates a value equal to or higher than a value equivalent to the temperature T1. Namely, if the power control device 2 is constituted of a relay, the controller 3 transmits a control signal for setting the relay in a disconnected state, whereas if the power control device 2 is constituted of a variable resistor, the controller 3 transmits a control signal for raising the resistance value at the variable resistor. In particular, by linking a disconnected state to a temperature of the liquid electrolyte lithium battery LB or gradually increasing the resistance value over the temperature range equal to and above T1 (see FIG. 6) when the power control device 2 is constituted of a variable resistor, the liquid electrolyte lithium battery LB can be fully utilized to its limit while keeping down the extent to which the capacity decay progresses within a specific range.

Figure 7:
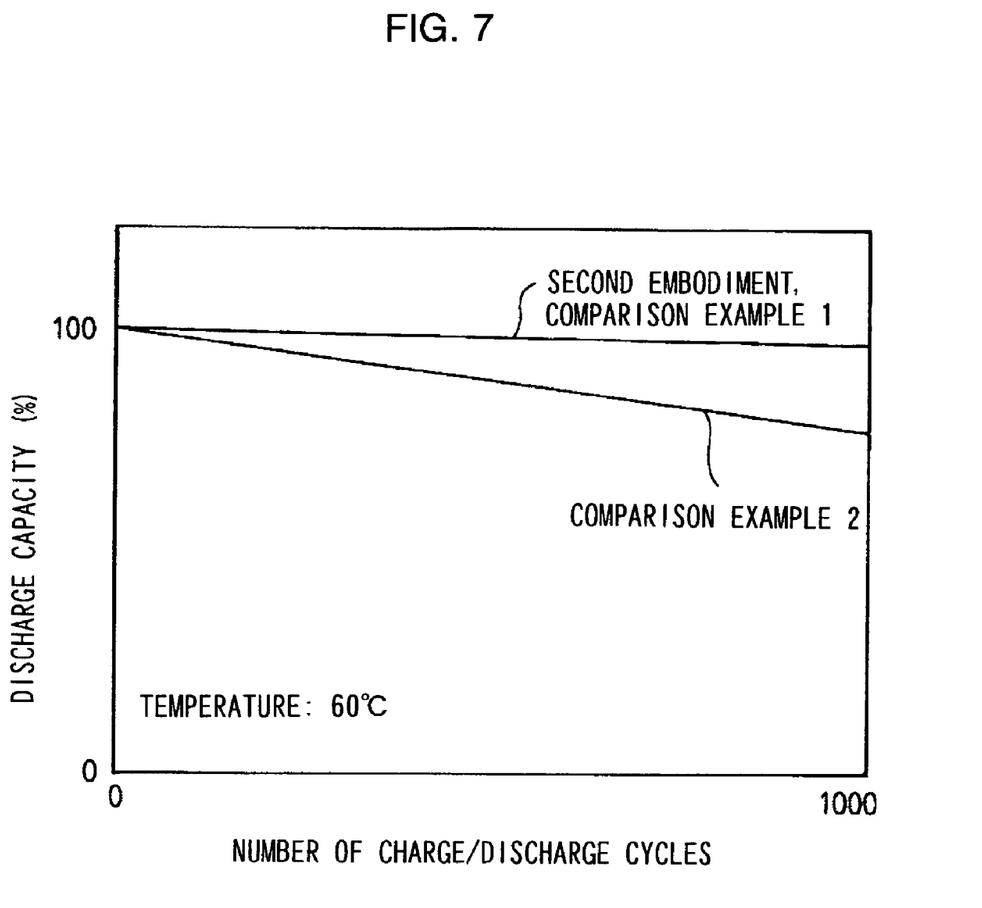
FIG. 7 shows a characteristics diagram of high-temperature durability characteristics.

In the second embodiment, due to the power control described above, deterioration characteristics of the power supply unit 1A at high temperatures are improved over those achieved in the first embodiment, and durability performance of the power supply unit 1A at high temperatures equal to that of comparison example 1 in which only solid lithium batteries SB are used is realized as shown in FIG. 7. It is to be noted that since a majority of the load is handled by the solid electrolyte lithium battery SB while the input/output power of the liquid electrolyte lithium battery LB is controlled, the temperature inside the solid electrolyte lithium battery SB rises to a great extent due to internal heat generation to achieve higher single-battery output characteristics compared to those of the individual solid lithium batteries SB used in comparison example 1. In addition, since the deterioration characteristics of the solid lithium battery SB are not significantly affected by the current value, the durability performance of the power supply unit 1A at high temperatures remains virtually intact even though the onus on the solid electrolyte lithium battery SB when controlling power is increased.

Variation of the Second Embodiment

Figure 8:
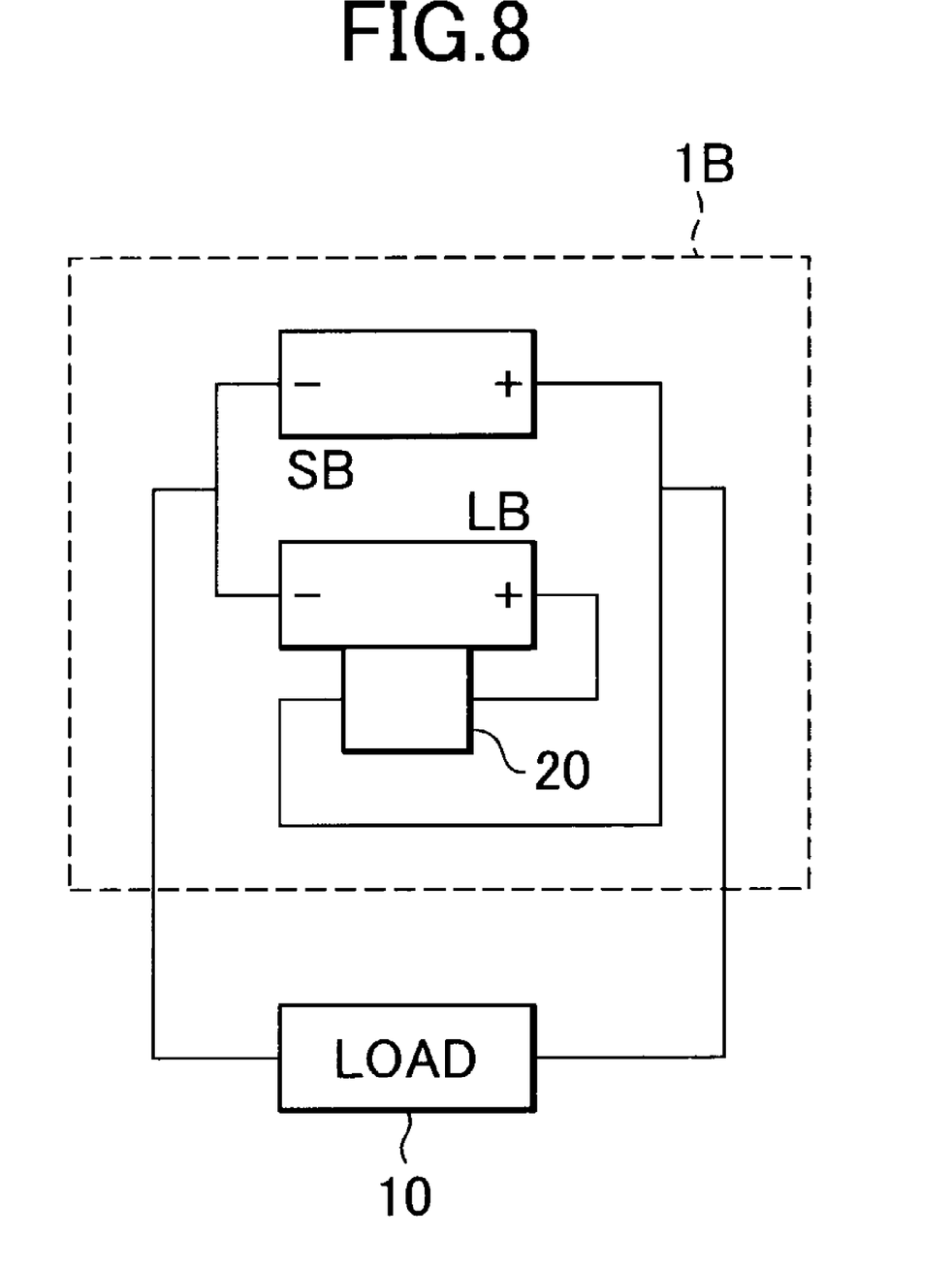
FIG. 8 shows a schematic diagram of a power supply unit adopted in an example of a variation of the second embodiment.
Figure 9:
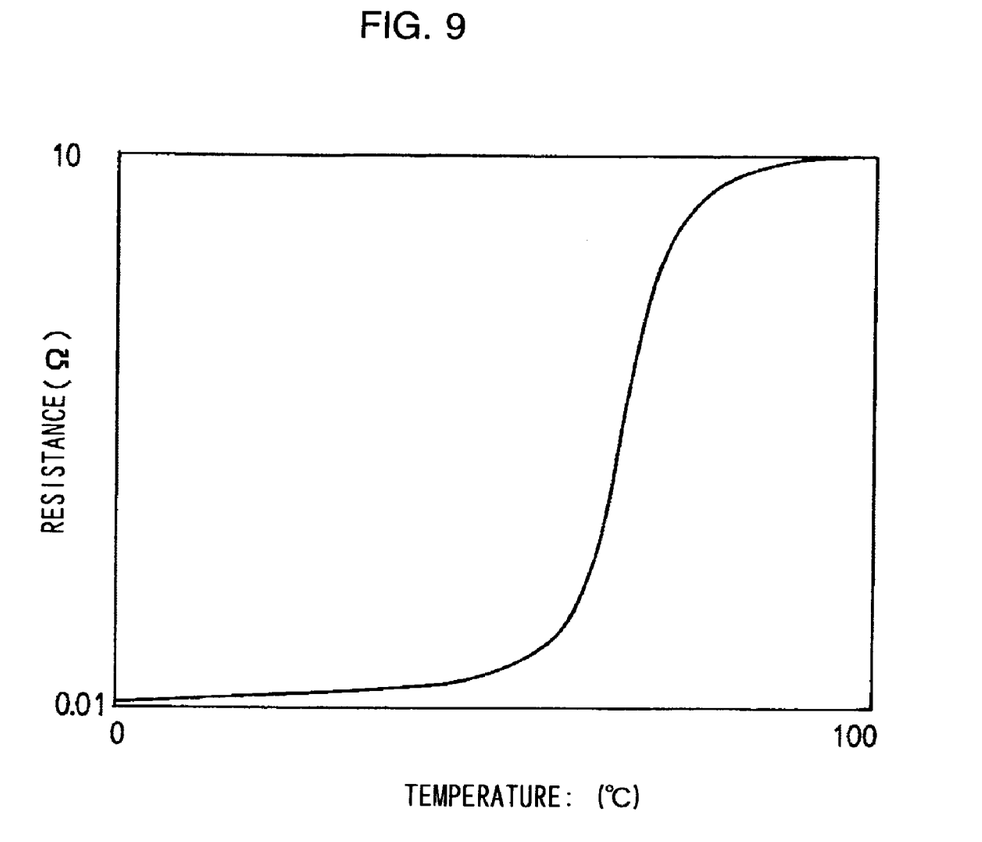
FIG. 9 shows a characteristics diagram of temperature-dependent resistance value characteristics observed in a PTC element.

FIG. 8 shows an example of a variation of the second embodiment. In FIG. 8, the power supply unit 1B comprises a PTC element 20 as the power control device 2 and the controller 3 is omitted. The resistance value of the PTC element changes in correspondence to the temperature, and the element has characteristics whereby the resistance value rapidly increases after the temperature exceeds a specific level, as shown in FIG. 9. This PTC element 20 is set at a position to which the temperature of the liquid electrolyte lithium battery LB is communicated and the characteristics of the PTC element 20 are set so as to start to increase the resistance value of the PTC element 20 when the temperature of the liquid electrolyte lithium battery LB becomes equal to or higher than T1. Through the use of the PTC element 20, the power control described earlier can be achieved without having to utilize the temperature sensor and the controller. It is desirable that a polymer PTC element with small internal resistance is used.

Third Embodiment

Figure 10:
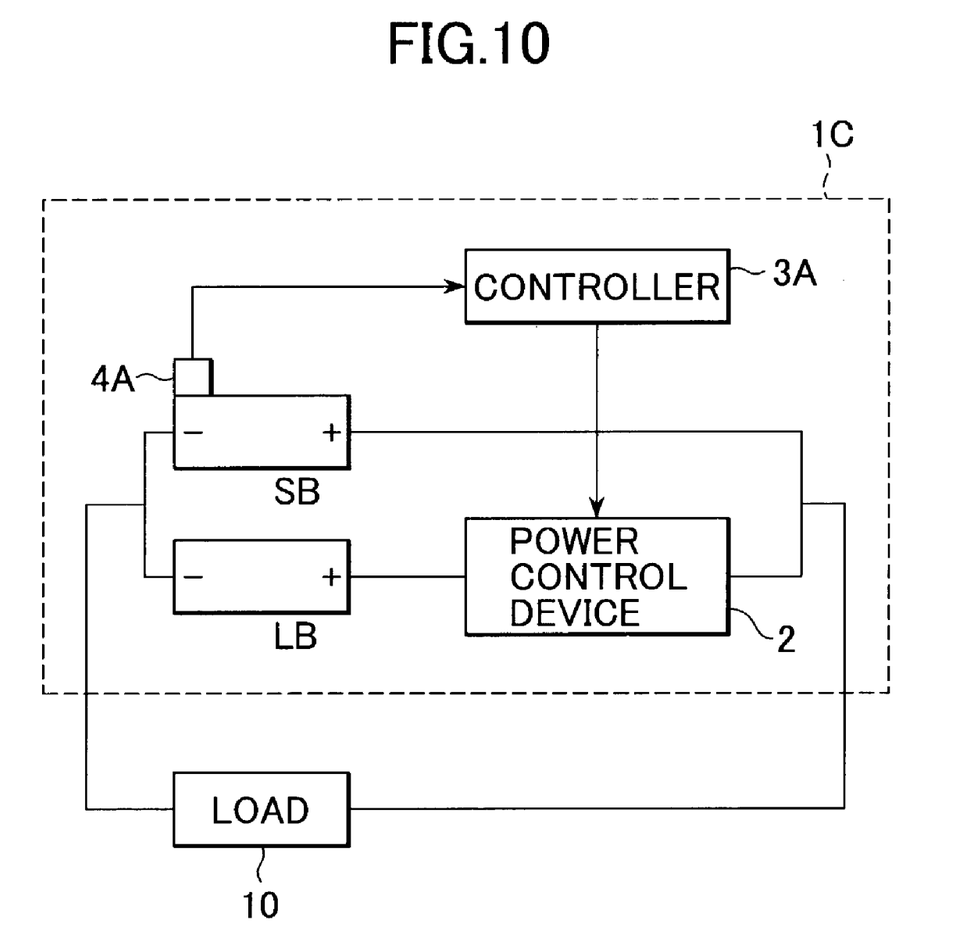
FIG. 10 shows a schematic diagram of a power supply unit adopted in the third embodiment of the present invention.

FIG. 10 shows a power supply unit 1C according to a third embodiment of the present invention. The power supply unit 1c is identical to the power supply unit 1A according to the second embodiment shown in FIG. 4, except that a temperature sensor 4A is provided at a position at which it is able to output a signal correlating to the temperature of the solid electrolyte lithium battery SB. The input/output power of the liquid electrolyte lithium battery LB is controlled in conformance to the temperature of the solid electrolyte lithium battery SB in this embodiment. For instance, with T2 indicating the temperature at which the output characteristics of the solid electrolyte lithium battery SB reach a sufficiently high level, a controller 3A may control the input/output power of the liquid electrolyte lithium battery LB when the output signal from the temperature sensor 4A indicates a level equal to or higher than a value equivalent to the temperature. Through such power control, an output power obtained from the liquid electrolyte lithium battery LB can be used at a low temperature at which sufficient output characteristics of the power supply unit 1C cannot be achieved through the solid electrolyte lithium battery SB alone.

It is to be noted that in the third embodiment the power control device 2 may be either a relay or a variable resistor, and also, a PTC element may be utilized so as to dispense with the temperature sensor 4A and the controller 3A.

Figure 11:
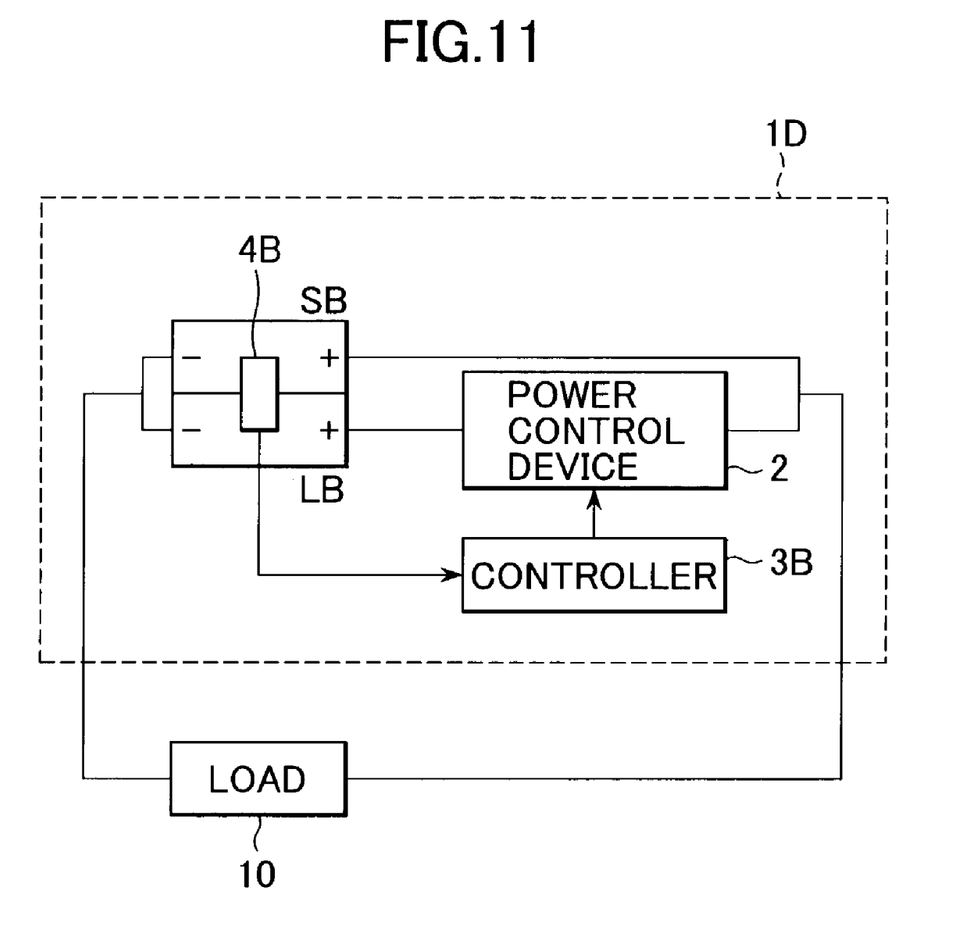
FIG. 11 shows a schematic diagram of a power supply unit adopted in the fourth embodiment of the present invention.

FIG. 11 shows a power supply unit 1D according to a fourth embodiment of the present invention. In this embodiment, the solid electrolyte lithium battery SB and the liquid electrolyte lithium battery LB are set in close proximity to each other, e.g. the two batteries are housed inside a single casing and the temperature sensor 4B is set at a position at which the temperature is equivalent to the average of the temperatures of the two batteries SB and LB. In this case, the input/output power of the liquid electrolyte lithium battery LB is controlled when the output signal from the temperature sensor 4B indicates a level equal to or higher than a predetermined value. The predetermined value used for the control may be a value corresponding to a temperature between the temperature T1 at which the capacity of the liquid electrolyte lithium battery LB starts to deteriorate rapidly and the temperature T2 at which the output characteristics of the solid electrolyte lithium battery SB reach a sufficiently high level. T1 is normally greater than T2, and the liquid electrolyte lithium battery LB is utilized more readily as the predetermined temperature is set closer to T1, whereas the degradation of the liquid electrolyte lithium battery LB is more effectively inhibited as the predetermined temperature is set closer to T2.

It is to be noted that in the fourth embodiment the power control device 2 may be either a relay or a variable resistor, and also, a PTC element may be utilized so as to dispense with the temperature sensor 4B and the controller 3B.

It is desirable that a power supply unit according to the present invention is applicable to an electric vehicle and a hybrid vehicle. However, the present invention is not limited to an application for these technical fields.

The disclosure of the following priority application is herein incorporated by reference: Japanese Patent Application No. 2002-85763 filed Mar. 26, 2002.

What is claimed is:

1. A power supply unit comprising:
   a solid electrolyte battery constituted by using a solid electrolyte instead of an electrolyte solution,
   a liquid electrolyte battery constituted by using an electrolytic solution connected in parallel to the solid electrolyte battery, and
   a power control device that is connected in series to the liquid electrolyte battery to control a power of the liquid electrolyte battery in conformance to a temperature of at least one of the liquid electrolyte battery and the solid electrolyte battery.

2. A power supply unit according to claim 1, wherein:
   the power control device controls the power of the liquid electrolyte battery in conformance to a temperature of the liquid electrolyte battery.

3. A power supply unit according to claim 2, wherein:
   the power control device reduces the power of the liquid electrolyte battery as the temperature of the liquid electrolyte battery increases.

4. A power supply unit according to claim 3, wherein:
   the power control device reduces the power of the liquid electrolyte battery when the temperature of the liquid electrolyte battery becomes equal to or higher than a first predetermined temperature.

5. A power supply unit according to claim 4, wherein:
   the first predetermined temperature is a level at which a capacity deterioration of the liquid electrolyte battery progresses rapidly.

6. A power supply unit according to claim 1, wherein:
   the power control device controls a power of the liquid electrolyte battery in conformance to the temperature of the solid electrolyte battery.

7. A power supply unit according to claim 6, wherein:
   the power control device reduces the power of the liquid electrolyte battery as the temperature of the solid electrolyte battery increases.

8. A power supply unit according to claim 7, wherein:
   the power control device reduces the power of the liquid electrolyte battery when the temperature of the solid electrolyte battery becomes equal to or higher than a second predetermined temperature.

9. A power supply unit according to claim 8, wherein:
   the second predetermined temperature is a level at which output characteristics of the solid electrolyte battery become desirable.

10. A power supply unit according to claim 8, wherein:
    the second predetermined temperature is smaller than a first predetermined temperature which is a level at which a capacity deterioration of the liquid electrolyte battery progresses rapidly.

11. A power supply unit according to claim 2, further comprising a temperature detector that detects a temperature of the liquid electrolyte battery, wherein:
    the power control device is constituted of a relay that is controlled by an output signal of the temperature detector to control a power of the liquid electrolyte battery.

12. A power supply unit according to claim 2, further comprising a temperature detector that detects a temperature of the liquid electrolyte battery, wherein:
    the power control device is constituted of a variable resistor whose resistance value increases when a liquid electrolyte battery temperature becomes equal to or higher than a first predetermined temperature to control a power of the liquid electrolyte battery.

13. A power supply unit according to claim 2, wherein:
    the power control device is constituted of a PTC element.

14. A power supply unit according to claim 13, wherein:
    a resistance value of the PTC element increases when the liquid electrolyte battery temperature becomes equal to or higher than a first predetermined temperature to control a power of the liquid electrolyte battery.

15. A power supply unit according to claim 14, wherein:
    the first predetermined temperature is a level at which a capacity deterioration of the liquid electrolyte battery progresses rapidly.

16. A power supply unit according to claim 13, wherein:
    the PTC element is a polymer PTC element.

17. A power supply unit according to claim 6, wherein:
    the power control device is constituted of a PTC element.

18. A power supply unit according to claim 17, wherein:
    a resistance value of the PTC element increases when the temperature of the solid electrolyte battery becomes equal to or higher than a second predetermined temperature to control a power of the liquid electrolyte battery.

19. A power supply unit according to claim 18, wherein:
    the second predetermined temperature is a level at which output characteristics of the solid electrolyte battery become desirable.

20. A power supply unit according to claim 17, wherein:
    the PTC element is a polymer PTC element.

21. A power supply unit according to claim 1, wherein:
    the solid electrolyte battery and the liquid electrolyte battery are each constituted of a lithium battery.

22. A power supply unit comprising:
    a solid electrolyte battery constituted by using a solid electrolyte instead of an electrolyte solution, a liquid electrolyte battery constituted by using an electrolytic solution connected in parallel to the solid electrolyte battery, a temperature detector that detects an average temperature of the solid electrolyte battery and the liquid electrolyte battery, and a power control device that controls the power of the liquid electrolyte battery in conformance to a temperature detected by the temperature detector.

* * * * *